United States Patent
Bok et al.

(10) Patent No.: US 10,259,912 B2
(45) Date of Patent: Apr. 16, 2019

(54) ORGANOPOLYSILOXANE COMPOSITION

(71) Applicant: KCC CORPORATION, Seoul (KR)

(72) Inventors: Kyoung Jin Bok, Gyeonggi-do (KR); Seung Kwang Seo, Seoul (KR); Jung Mo An, Incheon (KR); Seung Han Kim, Gyeonggi-do (KR)

(73) Assignee: KCC CORPORATION, Seoul (KR)

( * ) Notice: Subject to any disclaimer, the term of this patent is extended or adjusted under 35 U.S.C. 154(b) by 131 days.

(21) Appl. No.: 15/241,351

(22) Filed: Aug. 19, 2016

(65) Prior Publication Data
US 2017/0051115 A1    Feb. 23, 2017

(30) Foreign Application Priority Data

Aug. 21, 2015 (KR) .................. 10-2015-0117818

(51) Int. Cl.
| | |
|---|---|
| C08G 77/00 | (2006.01) |
| C08L 83/04 | (2006.01) |
| C08K 5/56 | (2006.01) |
| C08L 83/00 | (2006.01) |
| H01L 51/52 | (2006.01) |
| C08G 77/12 | (2006.01) |
| C08G 77/14 | (2006.01) |
| C08G 77/20 | (2006.01) |

(52) U.S. Cl.
CPC ............. *C08G 77/80* (2013.01); *C08K 5/56* (2013.01); *C08L 83/00* (2013.01); *C08L 83/04* (2013.01); *C08G 77/12* (2013.01); *C08G 77/14* (2013.01); *C08G 77/20* (2013.01); *C08L 2201/14* (2013.01); *C08L 2203/20* (2013.01); *C08L 2205/025* (2013.01); *C08L 2205/05* (2013.01); *H01L 51/5253* (2013.01)

(58) Field of Classification Search
CPC ...... C08G 77/20; C08G 77/12; H01L 51/5253
See application file for complete search history.

(56) References Cited

U.S. PATENT DOCUMENTS

2010/0276721 A1* 11/2010 Yoshitake ............... C08L 83/00
257/99

FOREIGN PATENT DOCUMENTS

| JP | 2002-265787 | 9/2002 |
|---|---|---|
| KR | 2013-0058638 | 6/2013 |
| WO | WO 2005-033207 | 4/2005 |
| WO | WO 2012-078617 | 6/2012 |

* cited by examiner

*Primary Examiner* — Kuo Liang Peng
(74) *Attorney, Agent, or Firm* — Harness, Dickey & Pierce, P.L.C.

(57) ABSTRACT

A curable organopolysiloxane composition which is capable of maintaining the refractive index and gas barrier at a certain level by incorporating diphenyl group into a silicone resin and maintaining the phenyl content at a certain level.

16 Claims, No Drawings

ORGANOPOLYSILOXANE COMPOSITION

CROSS-REFERENCE TO RELATED APPLICATIONS

This application is a non-provisional application claiming priority to Korean Patent Application No. 10-2015-0117818, filed on 21 Aug. 2015. The entire disclosure of the application identified in this paragraph is incorporated herein by reference.

BACKGROUND

The present invention relates to an organopolysiloxane composition.

Epoxy resin has been traditionally used as a molding material for light emitting diode (LED) elements. Epoxy resin has outstanding transmittance due to its high modulus of elasticity. However, various temperature conditions and temperature changes lead to the decline of lamp efficiency since the crystal structure collapses, cracks occur between the wire, chip, and epoxy resin, and disconnections occur occasionally between wire bondings. Moreover, epoxy resin has an unsatisfying physical property in the aspects of thermal resistance and light stability with brighter and shorter wavelengths. When a ray such as ultraviolet ray is transmitted to epoxy resin, the optical and chemical properties are damaged as the combination of organic polymer is destroyed. Accordingly, the molding material of epoxy resin turns yellow, affecting the color of the ray and decreasing the life span of the light emitting device.

It has been suggested to use silicone resin in order to solve the above problems. Compared to organic resin, not only is the thermal resistance and light stability of silicone better than those of epoxy resin, but it is transparent and not easily discolored or deteriorated physically. Thus, the use of silicone has been increasing in the field of light emitting diodes. Still, although silicone resin is outstanding in mechanical strength and chemical stability, it shows unsatisfactory physical property in the aspects of brightness, and therefore studies have continued to improve a higher brightness.

For example, Japanese Laid-open Patent Publication No. 2002-265787 discloses performing an additional curing of a particular organopolysiloxane with a phenyl group and an alkenyl group and a particular organohydrogenpolysiloxane with a phenyl group by using both the increase of siloxane crosslink and π-π interaction between aromatic rings in order to enhance the refractive index of the cured products. Also, there is a research for improving a gas barrier property of a molding material of a light emitting diode element.

SUMMARY

The present invention provides a liquid organopolysiloxane composition which is capable of maintaining a refractive index and a gas barrier at a certain level by maintaining a phenyl content at a certain level, by introducing a diphenyl group to a silicone resin. The present invention further provides a molding material for a light emitting diode element having a cured product of the composition, and a light emitting diode device having a light emitting diode element molded with the molding material.

The curable organopolysiloxane composition of the present invention has, on a 2-mm thick specimen in a cured state, an oxygen permeability of 250 cc/m²*day or lower as measured by ASTM D3985, and a refractive index of 1.55 or higher as measured by ASTM D1747.

The molding material for a light emitting diode element of the present invention includes a cured product of the above composition.

The light emitting diode device of the present invention includes a light emitting diode element which is molded with the above molding material.

According to the present invention, it is possible to provide a curable organopolysiloxane composition which is capable of maintaining the refractive index and gas barrier at a certain level by incorporating a diphenyl group into a silicone resin, and maintaining the phenyl content at a certain level. Furthermore, according to the present invention, a molding material for a light emitting diode element and a light emitting diode device using the same can be provided.

DETAILED DESCRIPTION

The present invention is described in detail below.

As used herein, Me represents methyl group, Ph represents phenyl group, and Vi represents vinyl group.

The curable organopolysiloxane composition of the present invention has, for a 2-mm thick specimen of the cured state, an oxygen permeability measured by ASTM D3985 of 250 cc/m²*day or lower, and a refractive index measured by ASTM D1747 of 1.55 or higher.

Although not limited in particular, the phenyl group contained in the composition may be from 40 to 60 mol %. In cases where the content of the phenyl group is too low, the oxygen permeability of the cured product of the composition may become too high and the refractive index may become too low. On the contrary, if the content of the phenyl group is too high, yellowing of the composition may be occurred and flowability of the composition may be decreased.

The curable organopolysiloxane composition of the present invention may include a compound of Chemical Formula 1 and Chemical Formula 2.

$(R^1R^2R^3SiO_{1/2})_a \cdot (R^4R^5SiO_{2/2})_b \cdot (R^6SiO_{3/2})_c \cdot (SiO_{4/2})_d$  [Chemical Formula 1]

$(R^7R^8R^9SiO_{1/2})_a \cdot (R^{10}SiO_{3/2})_c$  [Chemical Formula 2]

In the above formulas, each of $R^1$ to $R^3$ and $R^7$ to $R^9$ is independently an alkenyl group with a carbon number of 2 to 10, or a monovalent hydrocarbon group with a carbon number of 1 to 12 other than the alkenyl group, provided that one or more of $R^1$ to $R^3$ and one or more of $R^7$ to $R^9$ are alkenyl groups with a carbon number of 2 to 10, each of $R^4$ to $R^6$ and $R^{10}$ is independently a monovalent hydrocarbon group with a carbon number of 1 to 12 other than the alkenyl group, and a, b, c and d, respectively, satisfy 0<a<1, 0≤b<1, 0<c<1, 0≤d<1 and a+b+c+d=1.

More particularly, in the above formulas, each of $R^1$ to $R^3$ and $R^7$ to $R^9$ is independently an alkenyl group with a carbon number of 2 to 8, an alkyl group with a carbon number of 1 to 12, or an aryl group with a carbon number of 6 to 12, provided that one or more of $R^1$ to $R^3$ and one or more of $R^7$ to $R^9$ are alkenyl groups with a carbon number 2 to 8, each of $R^4$ to $R^6$ and $R^{10}$ is independently an alkyl group with a carbon number of 1 to 12, or an aryl group with a carbon number of 6 to 12, and a, b, c and d, respectively, satisfy the formula 0<a<0.7, 0.1≤b<0.6, 0<c<0.9, 0≤d<0.5 and a+b+c+d=1.

Still more particularly, in the above formulas, each of $R^1$ to $R^3$ and $R^7$ to $R^9$ is independently an alkenyl group with a carbon number of 2 to 4, an alkyl group with a carbon number of 1 to 4, or an aryl group with a carbon number of 6 to 12, provided that one or more of $R^1$ to $R^3$ and one or more of $R^7$ to $R^9$ are alkenyl groups with a carbon number 2 to 4, and each of $R^4$ to $R^6$ and $R^{10}$ is independently an aryl group with a carbon number of 6 to 12.

In one embodiment, in the above formulas, each of $R^1$ to $R^3$ and $R^7$ to $R^9$ may be independently vinyl, allyl, butenyl, hexenyl, methyl, ethyl, propyl, cyclohexyl, phenyl, tolyl or naphthyl, provided that one or more of $R^1$ to $R^3$ and one or more of $R^7$ to $R^9$ are vinyl, allyl, butenyl or hexenyl, each of $R^4$ to $R^6$ and $R^{10}$ may be independently methyl, ethyl, propyl, cyclohexyl, phenyl, tolyl or naphthyl, and a, b, c and d, respectively, may satisfy $0.05 \leq a \leq 0.7$, $0.1 \leq b \leq 0.4$, $0.3 \leq c \leq 0.7$, $0 \leq d < 0.3$ and $a+b+c+d=1$.

In the composition of the present invention, the compound of the above Chemical Formula 1 includes M unit ($R^1R^2R^3SiO_{1/2}$), D unit ($R^4R^5SiO_{2/2}$), T unit ($R^6SiO_{3/2}$) and Q unit ($SiO_{4/2}$) as the main resin. Among the above units, only M unit has an alkenyl group which is the reactive group, whereas D unit, T unit and Q unit do not have a reactive group, and thus can inhibit posturing.

The examples of the compound of Chemical Formula 1 may include the following compounds.

$(ViMe_2SiO_{1/2})_a \cdot (MePhSiO_{2/2})_b \cdot (PhSiO_{3/2})_c \cdot (SiO_{4/2})_d$
$(Vi_2MeSiO_{1/2})_a \cdot (MePhSiO_{2/2})_b \cdot (PhSiO_{3/2})_c \cdot (SiO_{4/2})_d$
$(Vi_3SiO_{1/2})_a \cdot (MePhSiO_{2/2})_b \cdot (PhSiO_{3/2})_c \cdot (SiO_{4/2})_d$
$(ViMe_2SiO_{1/2})_a \cdot (MePhSiO_{2/2})_b \cdot (MeSiO_{3/2})_c \cdot (SiO_{4/2})_d$
$(Vi_2MeSiO_{1/2})_a \cdot (MePhSiO_{2/2})_b \cdot (MeSiO_{3/2})_c \cdot (SiO_{4/2})_d$
$(Vi_3SiO_{1/2})_a \cdot (MePhSiO_{2/2})_b \cdot (MeSiO_{3/2})_c \cdot (SiO_{4/2})_d$
$(ViMe_2SiO_{1/2})_a \cdot (Ph_2SiO_{2/2})_b \cdot (PhSiO_{3/2})_c \cdot (SiO_{4/2})_d$
$(Vi_2MeSiO_{1/2})_a \cdot (Ph_2SiO_{2/2})_b \cdot (PhSiO_{3/2})_c \cdot (SiO_{4/2})_d$
$(Vi_3SiO_{1/2})_a \cdot (Ph_2SiO_{2/2})_b \cdot (PhSiO_{3/2})_c \cdot (SiO_{4/2})_d$
$(ViMe_2SiO_{1/2})_a \cdot (Ph_2SiO_{2/2})_b \cdot (MeSiO_{3/2})_c \cdot (SiO_{4/2})_d$
$(Vi_2MeSiO_{1/2})_a \cdot (Ph_2SiO_{2/2})_b \cdot (MeSiO_{3/2})_c \cdot (SiO_{4/2})_d$
$(Vi_3SiO_{1/2})_a \cdot (Ph_2SiO_{2/2})_b \cdot (MeSiO_{3/2})_c \cdot (SiO_{4/2})_d$
$(ViMe_2SiO_{v2})_a \cdot (Me_2SiO_{2/2})_b \cdot (PhSiO_{3/2})_c \cdot (SiO_{4/2})_d$
$(Vi_2MeSiO_{1/2})_a \cdot (Me_2SiO_{2/2})_b \cdot (PhSiO_{3/2})_c \cdot (SiO_{4/2})_d$
$(Vi_3SiO_{1/2})_a \cdot (Me_2SiO_{2/2})_b \cdot (PhSiO_{3/2})_c \cdot (SiO_{4/2})_d$
$(ViMe_2SiO_{1/2})_a \cdot (Me_2SiO_{2/2})_b \cdot (MeSiO_{3/2})_c \cdot (SiO_{4/2})_d$
$(Vi_2MeSiO_{1/2})_a \cdot (Me_2SiO_{2/2})_b \cdot (MeSiO_{3/2})_c \cdot (SiO_{4/2})_d$
$(Vi_3SiO_{1/2})_a \cdot (Me_2SiO_{2/2})_b \cdot (MeSiO_{3/2})_c \cdot (SiO_{4/2})_d$
$(ViMePhSiO_{1/2})_a \cdot (MePhSiO_{2/2})_b \cdot (PhSiO_{3/2})_c \cdot (SiO_{4/2})_d$
$(Vi_2PhSiO_{1/2})_a \cdot (MePhSiO_{2/2})_b \cdot (PhSiO_{3/2})_c \cdot (SiO_{4/2})_d$
$(ViMePhSiO_{1/2})_a \cdot (Ph_2SiO_{2/2})_b \cdot (PhSiO_{3/2})_c \cdot (SiO_{4/2})_d$
$(Vi_2PhSiO_{1/2})_a \cdot (Ph_2SiO_{2/2})_b \cdot (PhSiO_{3/2})_c \cdot (SiO_{4/2})_d$
$(ViMePhSiO_{1/2})_a \cdot (Ph_2SiO_{2/2})_b \cdot (MeSiO_{3/2})_c \cdot (SiO_{4/2})_d$
$(Vi_2PhSiO_{1/2})_a \cdot (Ph_2SiO_{2/2})_b \cdot (MeSiO_{3/2})_c \cdot (SiO_{4/2})_d$
$(ViMePhSiO_{1/2})_a \cdot (Me_2SiO_{2/2})_b \cdot (PhSiO_{3/2})_c \cdot (SiO_{4/2})_d$
$(Vi_2PhSiO_{1/2})_a \cdot (Me_2SiO_{2/2})_b \cdot (PhSiO_{3/2})_c \cdot (SiO_{4/2})_d$
$(ViMePhSiO_{1/2})_a \cdot (Me_2SiO_{2/2})_b \cdot (MeSiO_{3/2})_c \cdot (SiO_{4/2})_d$
$(Vi_2PhSiO_{1/2})_a \cdot (Me_2SiO_{2/2})_b \cdot (MeSiO_{3/2})_c \cdot (SiO_{4/2})_d$
$(ViPh_2SiO_{1/2})_a \cdot (MePhSiO_{2/2})_b \cdot (PhSiO_{3/2})_c \cdot (SiO_{4/2})_d$
$(Vi_2PhSiO_{1/2})_a \cdot (MePhSiO_{2/2})_b \cdot (PhSiO_{3/2})_c \cdot (SiO_{4/2})_d$
$(ViPh_2SiO_{1/2})_a \cdot (MePhSiO_{2/2})_b \cdot (MeSiO_{3/2})_c \cdot (SiO_{4/2})_d$
$(ViPh_2SiO_{1/2})_a \cdot (Ph_2SiO_{2/2})_b \cdot (PhSiO_{3/2})_c \cdot (SiO_{4/2})_d$
$(ViPh_2SiO_{1/2})_a \cdot (Ph_2SiO_{2/2})_b \cdot (MeSiO_{3/2})_c \cdot (SiO_{4/2})_d$
$(ViPh_2SiO_{1/2})_a \cdot (Me_2SiO_{2/2})_b \cdot (PhSiO_{3/2})_c \cdot (SiO_{4/2})_d$
$(ViPh_2SiO_{1/2})_a \cdot (Me_2SiO_{2/2})_b \cdot (MeSiO_{3/2})_c \cdot (SiO_{4/2})_d$ In the above formulas, a, b, c and d are the same as defined above.

The compound of the above Chemical Formula 1 may be included in the composition in an amount of 50 to 90% by weight—for example, 55 to 85% by weight or 60 to 80% by weight, based on the total weight of the composition. By controlling the amount of the compound of Chemical Formula 1 within the above ranges, it is possible to obtain sufficient mechanical strength and at the same time, inhibit the degradation of flexibility due to high crosslink density.

The weight average molecular weight of the compound of Chemical Formula 1 may be 1000 to 1800, or 1100 to 1700, or 1200 to 1600.

The amount of Ph may be 60 to 85 mol %, or 60 to 80 mol %, or 60 to 75 mol %. The amount of Vi may be 5 to 13.5 mol %, or 7 to 13 mol %, or 9 to 12.8 mol %. The R/Si ratio may be 1.4 to 3, or 1.5 to 2.5, or 1.55 to 2.2.

In one embodiment, the compound of Chemical Formula 1 includes diphenyl group.

Although not limited in particular, the compound has diphenyl group in an amount of 5 to 40 mol %, or 10 to 30 mol %, or 15 to 20 mol %. In cases where the amount of diphenyl group is lower than the above, the barrier efficiency of the cured product is decreased, and in cases where the amount of diphenyl group is higher than the above, the cured product may show stickiness at a room temperature. By having diphenyl group, a molding layer with a high barrier property may be achieved In addition to the compound of Chemical Formula 1, the composition of the present invention includes the compound of Chemical Formula 2 as a cross linking agent.

The compound of Chemical Formula 2 has an alkenyl group as a reactive group at the end of T unit.

The examples of the compound of Chemical Formula 2 may include the following compounds.

$(Me_2ViSiO_{1/2})_a \cdot (PhSiO_{3/2})_c$
$(MePhViSiO_{1/2})_a \cdot (PhSiO_{3/2})_c$
$(Ph_2ViSiO_{1/2})_a \cdot (PhSiO_{3/2})_c$
$(MeVi_2SiO_{1/2})_a \cdot (PhSiO_{3/2})_c$
$(PhVi_2SiO_{1/2})_a \cdot (PhSiO_{3/2})_c$
$(Vi_3SiO_{1/2})_a \cdot (PhSiO_{3/2})_c$
$(Me_2ViSiO_{v2})_a \cdot (MeSiO_{3/2})_c$
$(MePhViSiO_{1/2})_a \cdot (MeSiO_{3/2})_c$
$(Ph_2ViSiO_{1/2})_a \cdot (MeSiO_{3/2})_c$
$(MeVi_2SiO_{1/2})_a \cdot (MeSiO_{3/2})_c$
$(PhVi_2SiO_{1/2})_a \cdot (MeSiO_{3/2})_c$
$(Vi_3SiO_{1/2})_a \cdot (MeSiO_{3/2})_c$ The compound of Chemical Formula 2 may be included in the composition in an amount of 1 to 15% by weight—for example, 2 to 12% by weight or 3 to 8% by weight, based on the total weight of the composition. By controlling the amount of the compound of Chemical Formula 2 within the above ranges, it is possible to inhibit postcuring due to an incomplete crosslinking reaction and to prevent yellowing occurrence due to excessive unreacted alkenyl group.

The weight average molecular weight of the compound of Chemical Formula 2 may be 400 to 1000, or 500 to 900, or 550 to 900.

The amount of Ph may be 5 to 50 mol %, or 7 to 30 mol %, or 8 to 25 mol %. The amount of Vi may be 10 to 50 mol %, or 13 to 40 mol %, or 15 to 35 mol %. The R/Si ratio may be 1 to 3, or 1.3 to 2.8, or 1.5 to 2.8.

Hydrogen Crosslinking Agent

The hydrogen crosslinking agent has one or more aryl groups and two or more silicon-bonded hydrogens.

The hydrogen crosslinking agent may be included in the composition in an amount of 5 to 45% by weight—for example, 10 to 40% by weight or 15 to 30% by weight, based on the total weight of the composition. In cases where the amount of hydrogen crosslinking agent is lower than the above ranges, it is difficult to obtain a sufficient crosslink density and thus curing may not be completed or mechanical property may be degraded. In cases where the amount of hydrogen crosslinking agent is higher than the above ranges, light efficiency may be decreased since pores are formed inside the molding material and voids are formed on the surface of the molding material due to dehydrogenation reaction during curing caused by the excessive hydrogen reactive group.

Adhesion Promoter

In order to enhance the adhesiveness of the composition of the present invention with respect to a substrate, the composition may further include an adhesive or adhesion promoter. The adhesion promoter may be an organisilicon compound-based adhesion promoter, publicly known for hydrosilylation-curable organopolysiloxane composition.

The adhesion promoter may be included in the composition in an amount of 1 to 10% by weight—for example 1 to 8% by weight or 1 to 5% by weight, based on the total weight of the composition. In cases where the amount of adhesion promoter is lower than the above ranges, adhesive strength to the substrate may be insufficient, and in cases where the amount of adhesion promoter is higher than the above ranges, curing may be delayed.

As examples, there are organosilanes and straight, branched and cyclic organosiloxane oligomers with approximately 4 to 20 silicon atoms, which have, in each case, a functional group selected from the group consisting of trialkoxysiloxy group (for example, trimethoxysiloxy, triethoxysiloxy), trialkoxysilylalkyl group (for example, trimethoxysilylethyl, triethoxysilylethyl), hydrosilyl group, silicon-bonded alkenyl group (for example, vinyl, allyl), silicon-bonded methacryloxyalkyl group (for example, 3-methacrylicoxypropyl) and silicon-bonded epoxy-functional group (for example, 3-glycidoxypropyl, 4-glycidoxybutyl, 2-(3,4-epoxycyclohexyl)ethyl and 3-(3,4-epoxycyclohexyl)propyl). As other examples, there are epoxy-functional ethylpolysilicate and a reaction product of aminoalkyltrialkoxysilane and epoxy-functional alkyltrialkoxysilane.

In one embodiment, the adhesive promoter may include, but is not limited to, vinyltrimethoxysilane, allyltrimethoxylsilane, allyltriethoxylsilane, hydrogen triethoxylsilane, 3-glycidoxypropyltrimethoxylsilane, 3-glycidoxypropyltriethoxylsilane, 2-(3,4-ethoxycyclohexyl)ethyltrimethoxylsilane, 3-methacryloxypropyltrimethoxylsilane, 3-methacryloxypropyltriethoxylsilane, reaction product of 3-glycidoxypropyltriethoxylsilane and 3-aminoalkyltrialkoxysilane, silanol-terminated methylvinylsiloxane oligomers, condensation reaction product of silanol-terminated methylphenylsiloxane oligomer and 3-glycidoxypropyltrimethoxylsilane, condensation reaction product of silanol-terminated methylvinylsiloxane oligomer and 3-methacryloxypropyltriethoxylsilane, and tri(3-trimethoxysilylpropyl) isocyanurate.

Hydrosilylation Catalyst

As a catalyst for hydrosilylation contained in the present curable organosiloxane composition having an adhesion promoter, for example, a catalyst in the form of platinum group element or compound of platinum group element may be used, but not limited thereto. For example, a platinum-based catalyst, a rhodium-based catalyst and a palladium-based catalyst may be used.

As the platinum-based catalyst, platinum fine powder, platinum black, chloroplatinic acid, alcohol-modified product of chloroplatinic acid, chloroplatinic acid/diolefin complex, platinum/olefin complex, platinum-carbonyl complex [for example, platinum bis(acetoacetate) and platinum bis(acetylacetonate)], chloroplatinic acid/alkenylsiloxane complex [for example, chloroplatinic acid/divinyltetramethyldisiloxane complex and chloroplatinic acid/tetravinyltetramethylcyclotetrasiloxane complex], platinum/alkenyl siloxane complex [for example, platinum/divinyltetramethyldisiloxane complex and platinum/tetravinyltetramethylcyclotetrasiloxane complex] and complex of chloroplatinic acid and acetylene alcohol, etc. may be used. Particularly, platinum/alkenylsiloxane complex may be used.

As alkenylsiloxane for the above complexes, 1,3-divinyl-1,1,3,3-tetramethyldisiloxane, 1,3,5,7-tetramethyl-1,3,5,7-tetravinylcyclotetrasiloxane, alkenylsiloxane oligomer obtained by substituting methyl part of the aforementioned alkenylsiloxane to, for example, ethyl, phenyl, etc., and alkenylsiloxane oligomer obtained by substituting vinyl part of the aforementioned alkenylsiloxane to, for example, allyl or hexenyl may be used. Among these, 1,3-divinyl-1,1,3,3-tetramethyldisiloxane may be used since it forms platinum/alkenylsiloxane complex with a good stability.

The above platinum-siloxane complex may be included in the composition in a state of dissolution in an organic solvent such as xylene.

The catalyst for hydrosilylation is mixed in an amount to promote the curing of the composition of the present invention. The mixing amount is not limited in particular. The catalyst for hydrosilylation may be included in the composition in an amount of 0.1 to 100 ppm, or 0.5 to 30 ppm, based on the total weight of the composition. In cases where the amount of the catalyst is too little, the cure rate may decrease or the curing process may not proceed at all, and in cases where the amount of the catalyst is too high, functional deterioration such as coloring may be occurred.

Reaction-Retarding Agent

The curable organosiloxane composition may include a small amount of reaction-retarding agent if needed, and as the reaction-retarding agents, for example, 1-ethynyl-1-cyclohexanol, etc. may be used. The amount of reaction-retarding agent may be 0.08% by weight or less, based on the total weight of the composition. The minimum amount of reaction-retarding agent, for example, may be 0.0001% by weight. Especially, in cases where the amount of reaction-retarding agent is too high, the curing rate may be decreased.

Optional Components

The composition of the present invention may further include one or more optional components selected from mineral filler (i.e., silica, glass, alumina, zinc oxide, etc.); silicone rubber powder; resin powder (i.e., silicone resin, polymethacrylate resin, etc.); heat-resistant material; antioxidant; radical scavenger; light stabilizer; dye; pigment; and flame-retardant additives, as long as it does not hinder the purpose of the invention.

The curable organosiloxane composition of the present invention is not limited to particular application, and may be applied for molding a semiconductor light device element or for an optical lens.

Another aspect of the present invention provides a molding material for a light emitting diode element having the cured product of the above composition. Still another aspect of the present invention provides a light emitting diode device having a light emitting diode element which is molded with the above molding material.

The light emitting diode device of the present invention is described in detail below.

The light emitting diode device of the present invention includes a light emitting diode element inside wherein the light emitting diode element is molded with a cured product of the present composition as described above. The composition used in the present invention for a light emitting diode element may be further used for a semiconductor laser element, an organic electroluminescence (EL), a photodiode element, a phototransistor element, a solid state imaging element, and a light receiving and light emitting element for photocoupler.

The composition of the invention may be applied to light emitting devices by using, for example, dispensing, molding, etc. which are publicly known in the art. In the present invention, a silicone composition may be applied to a surface-mounted type LED lead frame by using a dispensing process. In the silicone composition of the present invention, silicate of nitride may be used as a fluorescent substance, but the kinds of fluorescent substances are not limited thereto. As the surface-mounted type LED lead frame, open tool, top-view 3528 4 pad B type manufactured by Jungjin Nextech Co. Ltd. may be used. After dye-bonding and wire-bonding, the silicone composition may be dispensed on the lead frame and the curing reaction may be conducted in an oven at 50 to 200° C.

The present invention is described in detail through the examples below. However, the examples are only meant to facilitate understanding of the present invention, and the range of the present invention is not limited to the examples by any means.

The examples and comparative examples of the curable organopolysiloxane composition of the present invention are explained in detail below. The physical properties of the curable organopolysiloxane composition before/after curing were measured by the methods indicated below.

[Viscosity of the Curable Organopolysiloxane]

The viscosity was measured at 25° C. by using a rheometer (MCR301, MCR302 model) manufactured by Anton Paar company.

[Refractive Index]

The refractive index was measured at 25° C. by using Abbe refractometer at 589 nm (ASTM D1747).

[Hardness]

The curable organopolysiloxane composition was cured in a mold which could provide a 2-mm thick specimen at 150° C. for 3 hours. Three layers of the specimen were stacked and the hardness was measured by using Shore D durometer at 25° C.

[Oxygen Permeability]

The oxygen permeability was measured according to ASTM D3985 at 23° C. by using OX-Tran 2/61 manufactured by Mocon Inc.

EXAMPLE 1

In a flask equipped with a condenser, a thermometer, a line for nitrogen injection and an agitator, 103.01 g of phenyltrimethoxysilane, 20.15 g of divinyltetramethyldisiloxane and 70.53 g of dimethoxydiphenylsilane were fed, and with agitation 0.35 g of p-toluenesulfonic acid and distilled water were added dropwise thereto slowly. Then, 141.82 g of toluene was fed, and the feeding of distilled water and agitation were stopped, and phase separation was performed until the solution became neutral. Then, 0.4 g of potassium hydroxide 10% solution and distilled water were fed, toluene was refluxed, and the condensation water was removed until the remaining methoxy group and hydroxyl group disappeared. Lastly, distillation under reduced pressure was conducted at 160° C. under 1 torr for 2 hours to obtain a colorless and transparent organopolysiloxane in a solid phase with weight average molecular weight (M.W.) of 1,300, R/Si ratio of 1.70, vinyl content of 11.76 mol % and phenyl content of 64.71 mol %.

EXAMPLE 2

In a flask equipped with a condenser, a thermometer, a line for nitrogen injection and an agitator, 95.14 g of phenyltrimethoxysilane, 20.15 g of divinyltetramethyldisiloxane and 80.33 g of dimethoxydiphenylsilane were fed, and with agitation 0.35 g of p-toluenesulfonic acid and distilled water were added dropwise thereto slowly. Then, 141.82 g of toluene was fed, and the feeding of distilled water and agitation were stopped, and phase separation was performed until the solution became neutral. Next, 0.4 g of potassium hydroxide 10% solution and distilled water were fed, toluene was refluxed, and the condensation water was removed until the remaining methoxy group and hydroxyl group disappeared. Lastly, distillation under reduced pressure was conducted at 160° C. under 1 torr for 2 hours to obtain a colorless and transparent organopolysiloxane in solid phase with weight average molecular weight (M.W.) of 1,350, R/Si ratio of 1.65, vinyl content of 12.12 mol %, and phenyl content of 63.64 mol %.

EXAMPLE 3

In a flask equipped with a condenser, a thermometer, a line for nitrogen injection and an agitator, 110.91 g of phenyltrimethoxysilane, 20.15 g of divinyltetramethyldisiloxane and 55.27 g of dimethoxydiphenylsilane were fed, and with agitation 0.35 g of p-toluenesulfonic acid and distilled water were added dropwise thereto slowly. Then, 141.82 g of toluene was fed, and the feeding of distilled water and agitation were stopped, and phase separation was performed until the solution became neutral. Next, 0.4 g of potassium hydroxide 10% solution and distilled water were fed, toluene was refluxed, and the condensation water was removed until the remaining methoxy group and hydroxyl group disappeared. Lastly, distillation under reduced pressure was conducted at 160° C. under 1 torr for 2 hours to obtain a colorless and transparent organopolysiloxane in solid phase with weight average molecular weight (M.W.) of 1,450, R/Si ratio of 1.60, vinyl content of 12.50 mol %, and phenyl content of 62.50 mol %.

COMPARATIVE EXAMPLE 1

In a flask equipped with a condenser, a thermometer, a line for nitrogen injection and an agitator, 100 g of phenyltrimethoxysilane and 11.75 g of divinyltetramethyldisiloxane were fed, and with agitation 0.17 g of p-toluenesulfonic acid and distilled water were added dropwise thereto slowly. Then, 89.4 g of toluene was fed, and the feeding of distilled water and agitation were stopped, and phase separation was performed until the solution became neutral. Next, 0.22 g of potassium hydroxide 10% solution and distilled water were fed, toluene was refluxed, and the condensation water was removed until the remaining methoxy group and hydroxyl group disappeared. Lastly, distillation under reduced pressure was conducted at 160° C. under 1 torr for 2 hours to obtain a colorless and transparent organopolysiloxane in solid phase with weight average molecular weight (M.W.) of 1,900, R/Si ratio of 1.37, vinyl content of 13.55 mol %, and phenyl content of 59.36 mol %.

COMPARATIVE EXAMPLE 2

In a flask equipped with a condenser, a thermometer, a line for nitrogen injection and an agitator, 100 g of phenyltrimethoxysilane, 2.94 g of divinyltetramethyldisiloxane and 8.81 g of dimethoxydiphenylsilane were fed, and with agitation 0.17 g of p-toluenesulfonic acid and distilled water were added dropwise thereto slowly. Then, 89.4 g of toluene was fed, and the feeding of distilled water and agitation were stopped, and phase separation was performed until the solution became neutral. Next, 0.22 g of potassium hydroxide 10% solution and distilled water were fed, toluene was refluxed, and the condensation water was removed until the remaining methoxy group and hydroxyl group disappeared. Lastly, distillation under reduced pressure was conducted at 160° C. under 1 torr for 2 hours to obtain a colorless and transparent organopolysiloxane in solid phase with weight average molecular weight (M.W.) of 1,900, R/Si ratio of 1.39, vinyl content of 4.19 mole %, and phenyl content of 58.1 mol %.

[Curable Organosiloxane Composition]

Curable organosiloxane compositions were prepared by combining the organosiloxanes prepared according to Examples 1 to 3 and Comparative Examples 1 and 2, with compounds of B-1, C-1, D-1, E-1 and F-1 as below. The oxygen permeability of the curable organosiloxane composition was measured according to ASTM D3985 and the refractive index of the curable organosiloxane composition was measured according to ASTM D1747.

Mixture Composition

A. Compound of Chemical Formula 1

A-1-1. Organopolysiloxane prepared by Example 1
A-1-2. Organopolysiloxane prepared by Example 2
A-1-3. Organopolysiloxane prepared by Example 3
A-2-1. Organopolysiloxane prepared by Comparative Example 1
A-2-2. Organopolysiloxane prepared by Comparative Example 2

B-1. Compound of Chemical Formula 2

Organopolysiloxane, represented by the average chemical formula of $(C_6H_5SiO_{3/2})_{0.25}[(CH_3)_2(CH_2=CH)SiO_{1/2}]_{0.75}$, with weight average molecular weight of 700.

C-1. Hydrogen Crosslinking Agent

Organopolysiloxane, represented by the average chemical formula of $[(C_6H_5)_2SiO_{2/2}]_{0.33}[(CH_3)_2HSiO_{1/2}]_{0.67}$, with weight average molecular weight of 330.

D-1. Adhesion Promoter

Organopolysiloxane, represented by the average chemical formula of $[(CH_3)(C_6H_5)SiO_{2/2}]_{0.46}[(CH3)(CH2=CH)SiO_{2/2}]_{0.15}[(*Gp)SiO_{3/2}]_{0.39}$, with weight average molecular weight of 330. (*Gp=3-glycidoxypropyl)

E-1. Hydrosilylation Catalyst

Platinum complex of 1,3-divinyltetramethyldisiloxane

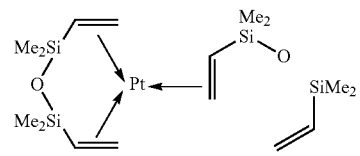

F-1. Reaction-Retarding Agent and Additives

Reaction-retarding agent: 1-ethinyl-1-cyclohexanol
Additive: 3-glycidoxlypropyltrimethoxysilane Five samples of curable organopolysiloxane were prepared by mixing compounds A (A-1-1, A-1-2, A-1-3, A-2-1 and A-2-2) and B-1 to F-1. The compounds B-1 to F-1 were mixed the composition in the same ratio. Each of the organopolysiloxanes (A-1-1 to A-2-2) shown in Table 1 was fed to the samples, respectively. The physical properties thereof were evaluated as in Table 2. The ratio of B-1 to F-1 was 13.31:78.74:7.11:0.02:0.82, based on 100 parts by weight of G-1.

TABLE 1

|  | Example 1 (A-1-1) | Example 2 (A-1-2) | Example 3 (A-1-3) | Comparative Example 1 (A-2-1) | Comparative Example 2 (A-2-2) |
|---|---|---|---|---|---|
| Molecular weight (MW) | 1,300 | 1,350 | 1,450 | 1,900 | 1,900 |
| R/Si | 1.70 | 1.65 | 1.60 | 1.37 | 1.39 |
| Vinyl (mol %) | 11.76 | 12.12 | 12.50 | 13.55 | 4.19 |
| Phenyl (mol %) | 64.71 | 63.64 | 62.50 | 59.36 | 58.1 |

TABLE 2

|  |  | Example |  |  | Comparative Example |  |
|---|---|---|---|---|---|---|
|  |  | 1 | 2 | 3 | 1 | 2 |
| Curable Organo-polysiloxane Composition | G-1 | 27.8 g | 27.8 g | 27.8 g | 27.8 g | 27.8 g |
|  | A-1-1 | 72.2 g | — | — | — | — |
|  | A-1-2 | — | 72.2 g | — | — | — |
|  | A-1-3 | — | — | 72.2 g | — | — |
|  | A-2-1 | — | — | — | 72.2 g | — |
|  | A-2-2 | — | — | — | — | 72.2 g |
| Substituent Content in Composition | Vinyl (mol %) | 8.45 | 8.66 | 8.06 | 7.79 | 6.66 |
|  | Phenyl (mol %) | 48.13 | 46.81 | 46.36 | 38.80 | 34.99 |
| Physical Property before Curing | Viscosity (cP) | 5,210 | 4,020 | 4,130 | 4,800 | 3,900 |
|  | Refractive Index | >1.55 | >1.55 | >1.55 | <1.55 | <1.55 |
| Physical Property after Curing | Hardness (Shore D) | 55 | 50 | 35 | 55 | 35 |
|  | Oxygen Permeability | 215 | 235 | 250 | 335 | 500 |
|  | Refractive Index | >1.55 | >1.55 | >1.55 | <1.55 | <1.55 |

According to Tables 1 and 2, it can be known that the curable organopolysiloxane composition of the present invention is capable of maintaining a content of the phenyl group in a certain range by incorporating a diphenyl group into a main resin, i.e., a silicone resin. Accordingly, the curable organopolysiloxane composition according to the present invention showed a decreased oxygen permeability and an increased refractive index after curing. However, in cases of Comparative Examples 1 and 2, the content of phenyl group was low and thus the resulting curable organopolysiloxane composition showed increased oxygen permeability and decreased refractive index.

What is claimed is:

1. A curable organopolysiloxane composition comprising a compound of Chemical Formula 1 and a compound of Chemical Formula 2, which has, on a 2-mm thick specimen in a cured state, an oxygen permeability of 250 cc/m$^2$*day or lower measured according to ASTM D3985, and a refractive index of 1.55 or higher measured according to ASTM D1747:

$(R^1R^2R^3SiO_{1/2})_a \cdot (R^4R^5SiO_{2/2})_b \cdot (R^6SiO_{3/2})_c \cdot (SiO_{4/2})_d$  [Chemical Formula 1]

wherein each of $R^1$, $R^2$, and $R^3$ is independently an alkenyl group with a carbon number of 2 to 10, or a monovalent hydrocarbon group with a carbon number of 1 to 12 other than the alkenyl group, provided that one or more of $R^1$, $R^2$, and $R^3$ are alkenyl groups with a carbon number of 2 to 10, each of $R^4$, $R^5$, and $R^6$ is independently a monovalent hydrocarbon group with a carbon number of 1 to 12 other than the alkenyl group, and a, b, c and d, respectively, satisfy 0<a<1, 0<b<1, 0<c<1, 0≤d<1, and a+b+c+d=1, $(R^7R^8R^9SiO_{1/2})_e \cdot (R^{10}SiO_{3/2})_f$  [Chemical Formula 2]

wherein each of $R^7$, $R^8$, and $R^9$ is independently an alkenyl group with a carbon number of 2 to 10, or a monovalent hydrocarbon group with a carbon number of 1 to 12 other than the alkenyl group, provided that one or more of $R^7$, $R^8$, and $R^9$ are alkenyl groups with a carbon number of 2 to 10, $R^{10}$ is independently a monovalent hydrocarbon group with a carbon number of 1 to 12 other than the alkenyl group, and e and f, respectively, satisfy 0<e<1, 0<f<1 and e+f=1.

2. The curable organopolysiloxane composition according to claim 1, wherein each of $R^4$, $R^5$, and $R^6$ is independently an alkenyl group with a carbon number of 2 to 8, an alkyl group with a carbon number of 1 to 12, or an aryl group with a carbon number of 6 to 12, provided that one or more of $R^4$, $R^5$, and $R^6$ are alkenyl groups with a carbon number 2 to 8, each of $R^4$, $R^5$, and $R^6$ is independently an alkyl group with a carbon number of 1 to 12, or an aryl group with a carbon number of 6 to 12, and a, b, c and d, respectively, satisfy the formula 0<a<0.7, 0.1≤b<0.6, 0<c<0.9, 0≤d<0.5, and a+b+c+d=1, each of $R^7$, $R^8$, and $R^9$ is independently an alkenyl group with a carbon number of 2 to 8, an alkyl group with a carbon number of 1 to 12, or an aryl group with a carbon number of 6 to 12, provided that and one or more of $R^7$, $R^8$, and $R^9$ are alkenyl groups with a carbon number 2 to 8, $R^{10}$ is independently an alkyl group with a carbon number of 1 to 12, or an aryl group with a carbon number of 6 to 12, and a and c, respectively, satisfy the formula 0<a<0.7, 0<c<0.9, and a+c=1.

3. The curable organopolysiloxane composition according to claim 1, wherein each of $R^1$, $R^2$, and $R^3$ is independently an alkenyl group with a carbon number of 2 to 4, an alkyl group with a carbon number of 1 to 4, or an aryl group with a carbon number of 6 to 12, provided that one or more of $R^1$, $R^2$, and $R^3$ are alkenyl groups with a carbon number 2 to 4, and each of $R^4$, $R^5$, and $R^6$ is independently an aryl group with a carbon number of 6 to 12, each of $R^7$, $R^8$, and $R^9$ is independently an alkenyl group with a carbon number of 2 to 4, an alkyl group with a carbon number of 1 to 4, or an aryl group with a carbon number of 6 to 12, provided that one or more of $R^7$, $R^8$, and $R^9$ are alkenyl groups with a carbon number 2 to 4, and $R^{10}$ is independently an aryl group with a carbon number of 6 to 12.

4. The curable organopolysiloxane composition according to claim 1, wherein each of $R^1$, $R^2$, and $R^3$ is independently vinyl, allyl, butenyl, hexenyl, methyl, ethyl, propyl, cyclohexyl, phenyl, tolyl or naphthyl, provided that one or more of $R^1$ to $R^3$ are vinyl, allyl, butenyl or hexenyl, each of $R^4$, $R^5$, and $R^6$ is independently methyl, ethyl, propyl, cyclohexyl, phenyl, tolyl or naphthyl, and a, b, c and d, respectively, satisfy 0.05≤a≤0.7, 0.1≤b≤0.4, 0.3≤c≤0.7, 0≤d<0.3 and a+b+c+d=1, each of $R^7$, $R^8$, and $R^9$ is independently vinyl, allyl, butenyl, hexenyl, methyl, ethyl, propyl, cyclohexyl, phenyl, tolyl or naphthyl, provided that one or more of $R^7$ to $R^9$ are vinyl, allyl, butenyl or hexenyl, $R^{10}$ is independently methyl, ethyl, propyl, cyclohexyl, phenyl, tolyl or naphthyl, and a and c, respectively, satisfy 0.05≤a≤0.7, 0.3≤c≤0.7, and a+c=1.

5. The curable organopolysiloxane composition according to claim 1, wherein the compound of Chemical Formula 1 is selected from the group consisting of:

$(ViMe_2SiO_{1/2})_a \cdot (MePhSiO_{2/2})_b \cdot (PhSiO_{3/2})_c \cdot (SiO_{4/2})_d$,
$(Vi_2MeSiO_{1/2})_a \cdot (MePhSiO_{2/2})_b \cdot (PhSiO_{3/2})_c \cdot (SiO_{4/2})_d$,
$(Vi_3SiO_{1/2})_a \cdot (MePhSiO_{2/2})_b \cdot (PhSiO_{3/2})_c \cdot (SiO_{4/2})_d$,
$(ViMe_2SiO_{1/2})_a \cdot (MePhSiO_{2/2})_b \cdot (MeSiO_{3/2})_c \cdot (SiO_{4/2})_d$,
$(Vi_2MeSiO_{1/2})_a \cdot (MePhSiO_{2/2})_b \cdot (MeSiO_{3/2})_c \cdot (SiO_{4/2})_d$,
$(Vi_3SiO_{1/2})_a \cdot (MePhSiO_{2/2})_b \cdot (MeSiO_{3/2})_c \cdot (SiO_{4/2})_d$,
$(ViMe_2SiO_{1/2})_a \cdot (Ph_2SiO_{2/2})_b \cdot (PhSiO_{3/2})_c \cdot (SiO_{4/2})_d$,
$(Vi_2MeSiO_{1/2})_a \cdot (Ph_2SiO_{2/2})_b \cdot (PhSiO_{3/2})_c \cdot (SiO_{4/2})_d$,
$(Vi_3SiO_{1/2})_a \cdot (Ph_2SiO_{2/2})_b \cdot (PhSiO_{3/2})_c \cdot (SiO_{4/2})_d$,
$(ViMe_2SiO_{1/2})_a \cdot (Ph_2SiO_{2/2})_b \cdot (MeSiO_{3/2})_c \cdot (SiO_{4/2})_d$,
$(Vi_2MeSiO_{1/2})_a \cdot (Ph_2SiO_{2/2})_b \cdot (MeSiO_{3/2})_c \cdot (SiO_{4/2})_d$,
$(Vi_3SiO_{1/2})_a \cdot (Ph_2SiO_{2/2})_b \cdot (MeSiO_{3/2})_c \cdot (SiO_{4/2})_d$,
$(ViMe_2SiO_{1/2})_a \cdot (Me_2SiO_{2/2})_b \cdot (PhSiO_{3/2})_c \cdot (SiO_{4/2})_d$,
$(Vi_2MeSiO_{1/2})_a \cdot (Me_2SiO_{2/2})_b \cdot (PhSiO_{3/2})_c \cdot (SiO_{4/2})_d$,
$(Vi_3SiO_{1/2})_a \cdot (Me_2SiO_{2/2})_b \cdot (PhSiO_{3/2})_c \cdot (SiO_{4/2})_d$,
$(ViMe_2SiO_{1/2})_a \cdot (Me_2SiO_{2/2})_b \cdot (MeSiO_{3/2})_c \cdot (SiO_{4/2})_d$,
$(Vi_2MeSiO_{1/2})_a \cdot (Me_2SiO_{2/2})_b \cdot (MeSiO_{3/2})_c \cdot (SiO_{4/2})_c$,
$(Vi_3SiO_{1/2})_a \cdot (Me_2SiO_{2/2})_b \cdot (MeSiO_{3/2})_c \cdot (SiO_{4/2})_d$,
$(ViMePhSiO_{1/2})_a \cdot (MePhSiO_{2/2})_b \cdot (PhSiO_{3/2})_c \cdot (SiO_{4/2})_d$,
$(Vi_2PhSiO_{1/2})_a \cdot (MePhSiO_{2/2})_b \cdot (PhSiO_{3/2})_c \cdot (SiO_{4/2})_d$,
$(ViMePhSiO_{1/2})_a \cdot (Ph_2SiO_{2/2})_b \cdot (PhSiO_{3/2})_c \cdot (SiO_{4,2})_d$,
$(Vi_2PhSiO_{1/2})_a \cdot (Ph_2SiO_{2/2})_b \cdot (PhSiO_{3/2})_c \cdot (SiO_{4/2})_d$,
$(ViMePhSiO_{1/2})_a \cdot (Ph_2SiO_{2/2})_b \cdot (MeSiO_{3/2})_c \cdot (SiO_{4/2})_d$,
$(Vi_2PhSiO_{1/2})_a \cdot (Ph_2SiO_{2/2})_b \cdot (MeSiO_{3/2})_c \cdot (SiO_{4/2})_d$,
$(ViMePhSiO_{1/2})_a \cdot (Me_2SiO_{2/2})_b \cdot (PhSiO_{3/2})_c \cdot (SiO_{4/2})_d$,
$(Vi_2PhSiO_{1/2})_a \cdot (Me_2SiO_{2/2})_b \cdot (PhSiO_{3/2})_c \cdot (SiO_{4/2})_d$,
$(ViMePhSiO_{1/2})_a \cdot (Me_2SiO_{2/2})_b \cdot (MeSiO_{3/2})_c \cdot (SiO_{4/2})_d$,
$(Vi_2PhSiO_{1/2})_a \cdot (Me_2SiO_{2/2})_b \cdot (MeSiO_{3/2})_c \cdot (SiO_{4/2})_d$,
$(ViPh_2SiO_{1/2})_a \cdot (MePhSiO_{2/2})_b \cdot (PhSiO_{3/2})_c \cdot (SiO_{4/2})_d$,
$(Vi_2PhSiO_{1/2})_a \cdot (MePhSiO_{2/2})_b \cdot (PhSiO_{3/2})_c \cdot (SiO_{4/2})_d$,
$(ViPh_2SiO_{1/2})_a \cdot (MePhSiO_{2/2})_b \cdot (MeSiO_{3/2})_c \cdot (SiO_{4/2})_d$,
$(ViPh_2SiO_{1/2})_a \cdot (Ph_2SiO_{2/2})_b \cdot (PhSiO_{3/2})_c \cdot (SiO_{4/2})_d$, $(\text{ViPh}_2\text{SiO}_{1/2})_a \cdot (\text{Ph}_2\text{SiO}_{2/2})_b \cdot (\text{MeSiO}_{3/2})_c \cdot (\text{SiO}_{4/2})_d$,
$(\text{ViPh}_2\text{SiO}_{1/2})_a \cdot (\text{Me}_2\text{SiO}_{2/2})_b \cdot (\text{PhSiO}_{3/2})_c \cdot (\text{SiO}_{4/2})_d$, and
$(\text{ViPh}_2\text{SiO}_{1/2})_a \cdot (\text{Me}_2\text{SiO}_{2/2})_b \cdot (\text{MeSiO}_{3/2})_c \cdot (\text{SiO}_{4/2})_d$.

6. The curable organopolysiloxane composition according to claim 1, wherein
the compound of Chemical Formula 1 is included in the composition in an amount of 50 to 90% by weight, based on the total weight of the composition.

7. The curable organopolysiloxane composition according to claim 6, wherein
the compound of Chemical Formula 1 is included in the composition in an amount of 60 to 80% by weight, based on the total weight of the composition.

8. The curable organopolysiloxane composition according to claim 1, wherein
the compound of Chemical Formula 2 is selected from the group consisting of: $(\text{Me}_2\text{ViSiO}_{1/2})_e \cdot (\text{PhSiO}_{3/2})_f$, $(\text{MePhViSiO}_{1/2})_e \cdot (\text{PhSiO}_{3/2})_f$, $(\text{Ph}_2\text{ViSiO}_{1/2})_e \cdot (\text{PhSiO}_{3/2})_f$, $(\text{MeVi}_2\text{SiO}_{1/2})_e \cdot (\text{PhSiO}_{3/2})_f$, $(\text{PhVi}_2\text{SiO}_{1/2})_e \cdot (\text{PhSiO}_{3/2})_f$, $(\text{Vi}_3\text{SiO}_{1/2})_e \cdot (\text{PhSiO}_{3/2})_f$, $(\text{Me}_2\text{ViSiO}_{1/2})_e \cdot (\text{MeSiO}_{3/2})_f$, $(\text{MePhViSiO}_{1/2})_e \cdot (\text{MeSiO}_{3/2})_f$, $(\text{Ph}_2\text{ViSiO}_{1/2})_e \cdot (\text{MeSiO}_{3/2})_f$, $(\text{MeVi}_2\text{SiO}_{1/2})_e \cdot (\text{MeSiO}_{3/2})_f$, $(\text{PhVi}_2\text{SiO}_{1/2})_e \cdot (\text{MeSiO}_{3/2})_f$, and $(\text{Vi}_3\text{SiO}_{1/2})_e \cdot (\text{MeSiO}_{3/2})_f$.

9. The curable organopolysiloxane composition according to claim 1, wherein
the compound of Chemical Formula 2 is included in the composition in an amount of 1 to 15% by weight, based on the total weight of the composition.

10. The curable organopolysiloxane composition according to claim 9, wherein
the compound of Chemical Formula 2 is included in the composition in an amount of 3 to 8% by weight, based on the total weight of the composition.

11. The curable organopolysiloxane composition according to claim 1,
further comprising 5 to 45% by weight of a hydrogen crosslinking agent, based on the total weight of the composition.

12. The curable organopolysiloxane composition according to claim 1,
further comprising 1 to 10% by weight of an adhesion promoter, based on the total weight of the composition.

13. The curable organopolysiloxane composition according to claim 1,
further comprising a catalyst selected from the group consisting of a platinum-based catalyst, a rhodium-based catalyst and a palladium-based catalyst.

14. The curable organopolysiloxane composition according to claim 1,
further comprising 0.08% by weight or less of a reaction-retarding agent.

15. A molding material for a light emitting diode element comprising a cured product of the composition according to claim 1.

16. A light emitting diode device comprising a light emitting diode element, wherein the light emitting diode element is molded with the molding material comprising a cured product of the composition according to claim 1.

* * * * *